Oct. 24, 1961  F. VAN ENDERT  3,005,403
SCRAP METAL BALING PRESS
Filed Jan. 24, 1957  4 Sheets-Sheet 1

Inventor:
FRITZ VAN ENDERT
Cleveland B. Hollabaugh
Attorney

Oct. 24, 1961    F. VAN ENDERT    3,005,403
SCRAP METAL BALING PRESS
Filed Jan. 24, 1957    4 Sheets-Sheet 2

Inventor:
FRITZ VAN ENDERT
Cleveland B. Hollabaugh
Attorney

Inventor:
FRITZ VAN ENDERT
Cleveland B. Hallabaugh.
Attorney

3,005,403
SCRAP METAL BALING PRESS
Fritz van Endert, Dusseldorf-Oberkassel, Germany, assignor to Waldemar Lindemann, Dusseldorf, Germany
Filed Jan. 24, 1957, Ser. No. 636,128
Claims priority, application Germany Feb. 13, 1956
5 Claims. (Cl. 100—98)

This invention relates to an improved scrap metal baling press and more particularly to a scrap metal baling press which is self-contained, which is capable of receiving a continuous feed of scrap metal and which is capable of receiving and compressing pieces of scrap metal which are too large to fit into its press box.

A wide variety of different types of presses for the compression of scrap metal into bales have heretofore been developed. These presses have all had in common the feature of being able to compress only pieces of scrap metal which are small enough to fit into the press box of the press. This feature has required that large pieces of scrap metal be cut into smaller pieces, as for example, by the use of an acetylene torch. This preliminary work is both time consuming and expensive. The amount of such work is continually increasing due to the increasing amounts of metal scrap in large pieces, such as, for example, automobile bodies, parts of railroad cars and the like, which are becoming available to the scrap metal industry.

Now, it is the object of this invention to provide a press for the baling of scrap metal which is able to receive and to compress pieces of scrap the dimensions of which considerably exceed those of the press box, without having previously to cut up these parts or to reduce their size by other means.

A further object of this invention is to provide a press which is able to receive a continuous feed of scrap metal as well as to handle individual pieces of scrap metal which are larger in their dimensions than its own press box.

Another object of this invention is to provide a press for the baling of scrap metal which is capable of precompressing pieces of scrap metal too large to fit into its press box, while simultaneously compressing a charge of scrap metal in its press box.

Other objects of this invention and its various advantageous features will become fully apparent from the detailed description of this invention which follows.

The scrap metal baling press in accordance with this invention comprises a press box, at least one press platen plunger which is movable in the press box and adapted to compress scrap metal positioned therein into bales, a charging trough from which scrap metal is discharged through an opening above the path of movement of the plunger of the press box, a charging platen movable in the said charging trough, a retaining wall opposite said feeding platen against which the charging platen can partially compress scrap metal, and a movable hinged lid on the said press box which is adapted to compress scrap metal in the press box as it closes.

The charging trough of this press affords a space which can receive pieces of scrap the dimensions of which are considerably larger than those of the press box of the press. The movable lid of the press box is hinged to swing upwardly and is provided with a means for opening and closing it. When in a fully open position the movable lid of the press box makes available for the reception of scrap a space the overall length of which is formed by the length of the charging trough, plus the width of the press box.

When in its open position, this movable lid of the press box can form an upper, vertical continuation of the side wall of the press box remote from the platen in the charging trough by swinging upwardly and, when in that open position, to function as a retaining wall opposite the charging platen. However, I prefer to position the press box cover to swing upwardly to form a continuation of one side of the charging trough as well as of a wall of the press box, and utilized a fixed wall as a retaining wall against which the charging platen can partially compress large pieces of scrap metal. The wall of the press box which is opposite the hinged side of the cover is likewise preferably extended vertically upwardly, so that there is formed a boxlike enclosure directly above the press box in which scrap metal moved from the charging trough can be heaped before being compressed into the press box by the closing of the cover.

The hinged lid of the press box can be, and preferably is, provided with a wall-like extension above the edge which is adjacent the charging trough which closes the end of the charging trough when the lid is closed. This wall-like extension serves the dual purpose of preventing scrap metal from reaching the outside of the cover of the press box when it is closed and of acting as a second retaining wall against which scrap metal in the charging trough can be precompressed by the charging platen at the same time scrap metal is being compressed in the press box.

The side edge of the hinged lid nearest the charging platen is preferably positioned in the same vertical plane as the adjacent edge of the opening of the charging trough into the press box and so disposed that when the cover is closed, the edge is positioned below the edge of the opening from the charging trough. This lower side edge of the hinged lid and the adjacent upper edge of the opening in the charging trough which is situated in the same plane can, and preferably are, provided with shearing knives which act cooperatively during the closing of the press box lid to cut any pieces of scrap metal which come between them.

The press box lid is advantageously so disposed that when it is closed, the edge of the lid opposite its hinged side is at some distance from the adjacent side wall of the box-like enclosure above the press box. This prevents the lid from being jammed by pieces of scrap coming between its front edge and the wall adjacent thereto. A platen in the press box is preferably so disposed that it presses the scrap inwardly away from this adjacent side wall, i.e., toward the hinged side of the press box lid. This arrangement of the press box platen permits the platen to be advanced to partially compress a load of scrap in the press box, to be withdrawn to its initial position, the press box lid opened to permit pieces of scrap metal in the space between the edge of the lid and the adjacent side wall to fall into the press box, and then to be compressed therein after the cover of the press box is closed.

Preferably, a cover plate is provided for the charging trough which is connected to the charging platen which extends rearwardly therefrom and protects the guides and drive for the platen from scrap metal. The charging trough is also preferably provided with an upward extension around its edges which forms a hopper in cooperation with the cover plate of the charging platen. This hopper is adapted to receive scrap metal when the charging platen is moved forwardly to wholly or partly close the charging trough. This construction enables the press to receive a continuous feed of scrap metal which may fall directly into its charging trough or into the hopper above the charging trough, depending upon the position of the charging platen within the charging trough. When the charging platen is fully withdrawn, the scrap falls directly into the charging trough. When the charging platen is fully advanced the scrap metal falls on the cover plate of the charging platen and as the charging platen is retracted scrap which has accumulated on its cover plate drops into the charging trough.

When the press box lid is closed, the charging trough of this press can receive pieces of scrap equal in length to its own length and partially compress them against the upwardly extending wall-like extension of the press box lid while scrap is being compressed within the press box. Alternatively, when the press box cover is open, the charging trough can receive pieces of scrap metal which have a length equal to its own length, plus the width of the press box, and such large pieces of scrap reduced in length by compression by the charging platen against the fixed upwardly extension of the outer side wall of the press box.

Pieces of scrap metal are sometimes encountered which by the preliminary compression in the charging trough, cannot be reduced to dimensions which permit them to drop into the press box. Such pieces of scrap metal can be sheared by the co-action of the knives on the edges of the charging trough and the press box lid, when the press box lid is closed.

Having now indicated the general nature of the scrap baling press in accordance with this invention and the manner in which it operates, I will now proceed with a detailed description of a preferred embodiment of this press with reference to the accompanying drawings in which like reference characters are used to designate like parts, wherever they may occur, with the exception of FIGURE 6 in which numbers higher by 100 are used to designate parts generally similar to those shown by the other figures. In the drawings.

Figure 1:
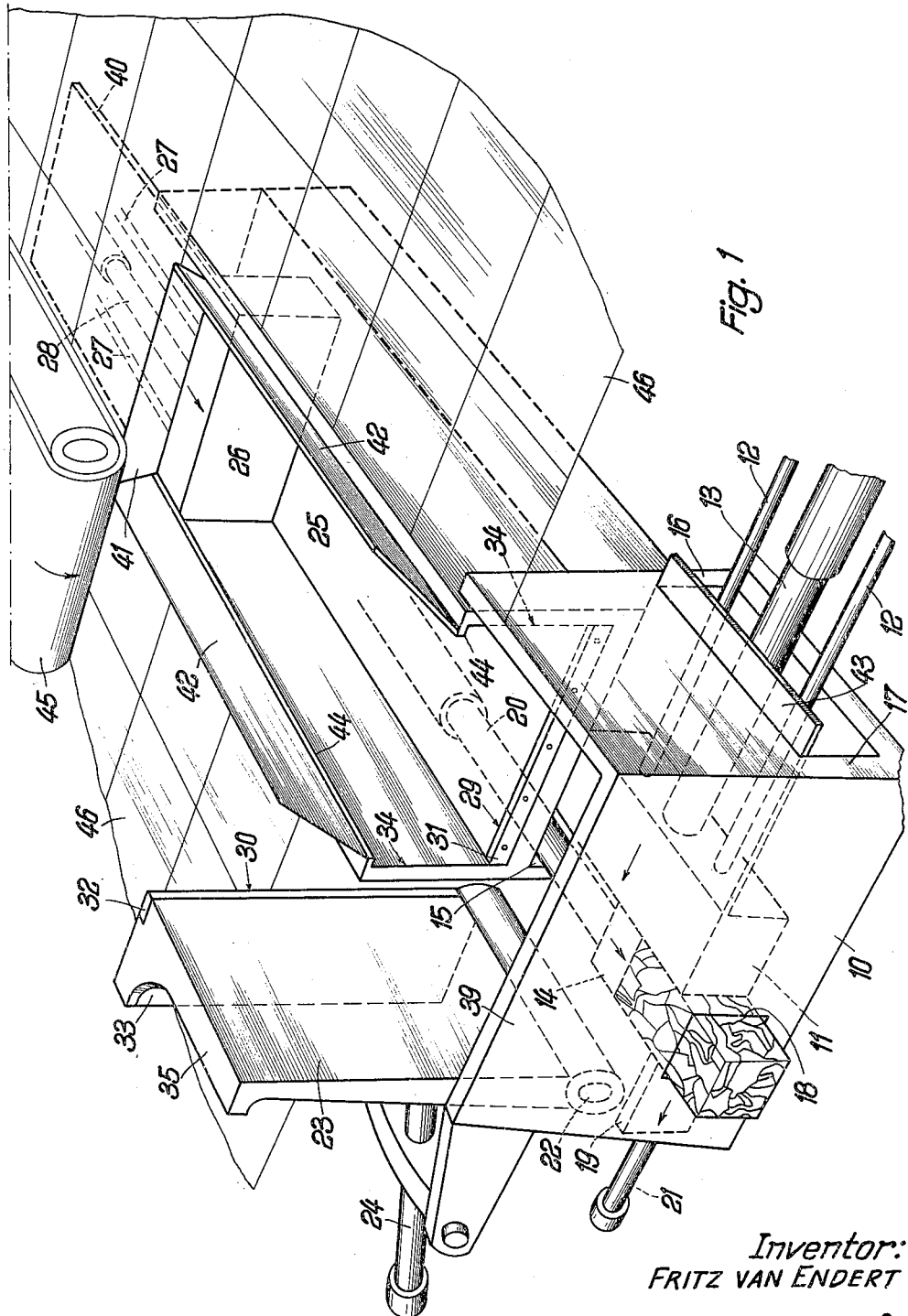
FIGURE 1 is a simplified perspective view of the press.
Figure 2:
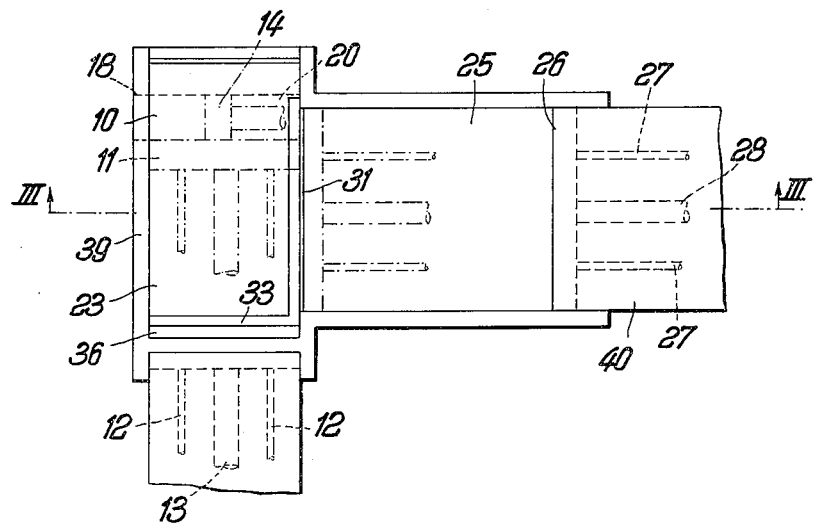
FIGURE 2 is a simplified plan view of the press taken from above.
Figure 3:
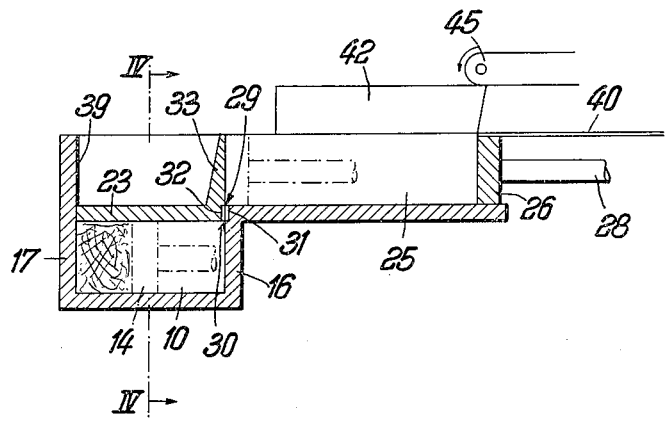
Figure 4:
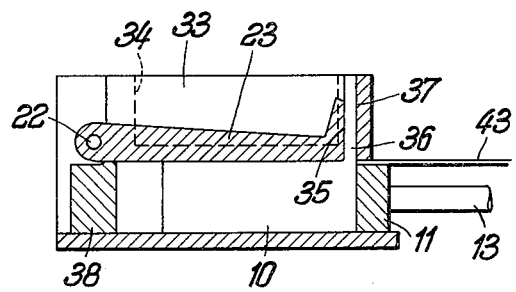
Figure 5:
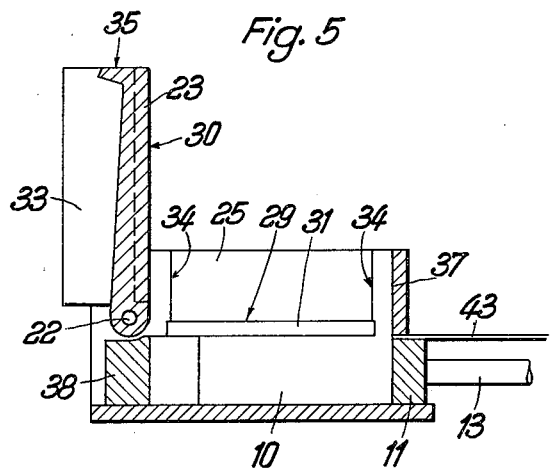
Figure 6:
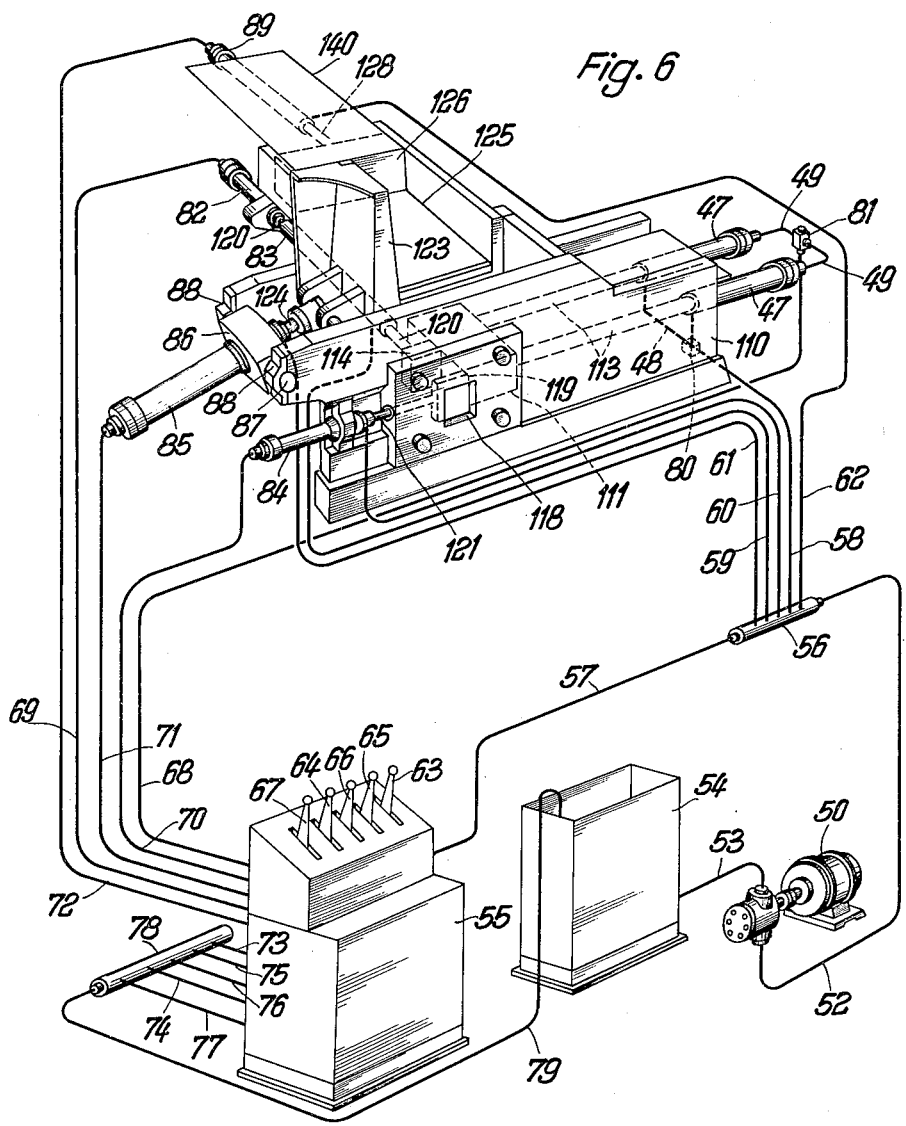

FIGURE 3 is a simplified cross-sectional view taken along the section line III—III of FIGURE 2, FIGURE 4 is a simplified cross-sectional view taken along the section line IV—IV of FIGURE 3, FIGURE 5 is a simplified, cross-sectional view similar to FIGURE 4, except in that it shows the lid of the press box in its open position, FIGURE 6 is a perspective view of an alternative embodiment of the scrap baling press in accordance with this invention and includes a diagrammatic illustration of a hydraulic drive system, showing the conduits for hydraulic fluid and control devices by which an operator controls the press.

Referring specifically to FIGURES 1–5, inclusive, of the drawings, the numeral 10 designates the press box of the press which is closed at the bottom and sides. The press box 10 is provided with a pressing platen 11 which completely fills the cross section of the press box and forms an end wall of the press box when it is in a completely retracted position. The platen 11 is carried by the guide rods 12, 12 and is driven by a double acting piston 13.

A second pressing platen 14 is movable at right angles to the direction of operation of the platen 11 and passes through an opening 15 in the side wall of the press box 10 into the interior of the box. The wall 17 of the press box 10 has an opening 18 which can be closed by a slide 19. The opening 18 is directly across the press box 10 from the working face of the platen 14. The platen 14 is driven by the double acting piston 20, while the slide 19 is moved by the double acting piston 21. The lid 23 by which the top of the press box 10 can be closed is hinged to the box 10 at 22. The lid 23 is opened and closed by a double acting piston 24.

The platen 11 is adapted to be forcefully advanced into the press box 10 by the action of the piston 13 to compress scrap metal in the area of the press box between the platen 14 and the slide 19, while the lid 23 is closed. The platen 14 is, in turn, adapted to advance laterally into the press box 10, under the forceful action of the piston 20 to further compress the scrap metal, already partially compressed by the action of the platen 11, against the slide 19. The piston 20 is further adapted to relax its pressure to permit the slide 19 to be withdrawn from across the opening 18 and then to eject the fully compressed bale of scrap metal from the press box 10 through the opening 18.

The long trough or chamber 25, which is referred to herein as the "charging trough" is positioned above the press box 10 and opens directly into the press box, when its lid 23 is open. The charging trough 25 is open at the top and in it is a charging platen 26 which fills its entire cross section and is movable through its length up to the edge of its opening into the press box 10. The platen 26 is carried on the guide rods 27, 27 and is driven by the double acting piston 28. The ledges 44, 44 along the upper edges of the sides of the charging trough 25, illustrated by FIGURE 1, act as further guides for the press platen 26. The ledges 44, 44 are omitted from the remaining figures of the drawings for the sake of clarity.

The edge of the opening between the charging trough 25 is situated in a plane above the platens 11 and 14 and is equipped with a shearing knife 31. The lower edge 30 of the lid 23 of the press box is formed by the shearing knife 32 and the hinge 22 of the lid is so disposed that the knife 32 coacts with the knife 31 to function as shears upon the closing of the lid 23 to cut any pieces of scrap metal which comes between them.

The lid 23 is provided with a member 33 which extends upwardly from the edge 30 when the lid 23 is in its closed position as best shown by FIGURE 3. When the lid 23 is closed this extension 33 closes the end of the charging trough 25, formed by the edge 29 and the edges 34, 34 of the side walls of the trough and acts as a retaining wall against which the press platen 26 can compress scrap metal and reduce the length of the long pieces of scrap sufficiently to permit them to fall into the press box 10 when the lid 23 is in the raised position illustrated by FIGURES 1, 5 and 6.

As best shown by FIGURE 4, when the lid 23 is closed, its front edge 35 is spaced a distance 36 from the adjacent wall 37 of the press. The spacing 36 provides a clearance which prevents the jamming of the lid by scrap metal as it is closed.

The wall 37 forms an upwardly continuation of the wall of the press box 10 formed by the platen 11 when it is in its retracted position. When the lid 23 is open, as illustrated by FIGURE 5, it forms an upper continuation of the wall 38 of the press box. The wall 39 opposite the mouth of the charging trough 25 also extends upwardly, and with the open lid 23 and the wall 37 defines a rectangular chamber above the press box 10 which has an open top and which opens into the charging trough 25. This rectangular chamber above the press box 10 permits scrap to be piled in the press box to a level considerably above the top of the press box formed by lid 23 when it is in a closed position. The closing of the lid 23 forces the excess scrap metal into the confines of the press box 10, thus further compressing the mass of metal prior to its final compression by the action of the pistons 13 and 20.

A cover plate 40 is fixed to the charging platen 26 and extends rearwardly from the platen and covers the part of the charging trough 25 which is situated to the rear of the press platen 26 when it is moved forwardly. The inclined walls 41 and 42, 42 on the upper edges of the charging trough 45 form a hopper-like upwardly extension of the charging trough. The plate 40 both forms a bottom for this hopper as the press platen is moved forwardly and protects the piston 28 and the guide rods 27, 27 from scrap metal.

The cover plate 43 is fixed to the press platen 11 and is similar in function to the plate 40 in that it protects the piston 13 and the guide rods 12, 12 from scrap metal. The drive mechanism of the press is covered by the plates 46, 46, which also functions as a floor from which the operation of the press can be observed.

In the operation of this press, the charging trough 25 is filled with scrap metal by any suitable means, for example, by the use of a conveyor 45, while the charging platen 26 is retracted and the lid 23 is open. The length of the pieces of scrap which the press will receive is then limited only by the distance between the working face of the platen 26 and the retaining wall 39. When the trough 25 has been filled, the charging platen 26 is advanced by the action of the piston 28. The pieces of scrap which are too long to fall directly into the press box 10 are compressed and shortened between the press platen 26 and the retaining wall 39.

If the pieces of scrap metal can all be compressed to an extent such that they all fall into the press box 10, the lid 23 is closed by the action of the piston 24, after the trough 25 has been completely emptied. The closing of the lid 23, compresses any scrap into the press box 10 which is piled higher than the faces of the platens 11 and 14. The platen 11 is then advanced by the action of the piston 13 to press the scrap metal to one side of the press box 10, so that it all lies in front of the platen 14. This action compresses the scrap metal between the face of the platen 14 and the wall 38 of the press box. The press platen 14 is then advanced by the action of the piston 20, while the slide 19 is in position to close the opening 18. This action gives the bale of scrap metal its final compression between the face of the platen 14 and the slide 19. The pressure applied by the piston 20 is then relaxed and the slide 19 removed from the opening 18 by the action of the piston 21. The platen 14 is then further advanced by the piston 20 to eject the compressed bale of scrap metal from the press through the opening 18.

If the pieces of scrap metal in the charging trough 25 cannot be reduced by the action of the charging platen 26 to a size such that they can fall into the press box 10 and they still extend partly into the interior of the charging trough 25, the lid 23 is partially closed by the action of the piston 24 to cause it to press on the parts of the scrap metal which project above the edge 29, so that they are pushed downwardly. This action shortens the pieces of scrap and after the lid 23 has been raised by the action of the piston 24, they are again pushed forwardly by the charging platen 26.

If these measures are inadequate to reduce the pieces of scrap to size which permits them to drop into the press box 10, the lid 23 is completely closed and the projecting parts are cut off by the cooperative action of the knives 31 and 32, so that the cut off parts below the lid 23 fall into the press box 10. The lid 23 can then be opened and the parts of the scrap metal remaining in the charging trough moved forwardly. If the dimensions of the pieces of scrap metal remaining in the charging trough 25 are still too large to permit them to fall into the press box 10, this procedure can be repeated by again closing the lid 23. This procedure may be repeated several times if necessary, until all the pieces of scrap metal fit into the press box 10.

When the lid 23 of the press box 10 is closed the wall 33 closes the end of the charging trough 25, as illustrated by FIGURE 3. Therefore, when filling the charging trough 25 with scrap metal, no pieces of the scrap metal can reach the top surface of the lid 23. Further, when the lid is closed, pieces of scrap metal which are no longer than the distance between the retracted feeding platen 26 and the wall 33 can be precompressed between the wall 33 and the platen 26 by the action of the piston 28, while the scrap metal from the preceding charge is being compressed in the press box 10. Thus, when the lid 23 is closed during the compression of a charge of scrap metal into a compact bale within the press box 10, the wall 33 acts both to retain scrap within the charging trough 25 and keep it off the top of the lid 23 and as a retaining wall to permit the precompression of a charge of scrap metal within the charging trough 25.

The cover plate 40 and the hopper-like upward extensions 41 and 42, 42 permit the continuous charging of this press, without regard to either the individual phases of the precompression and cutting processes in the charging trough 25 or the individual stages of the final compression steps within the press box 10. Thus, when the feeding platen 26 has been wholly or partially advanced, the scrap metal falls on the plate 40 within the hopper formed by the extensions 41 and 42, 42 and remain there until the platen 26 is retracted by the action of the piston 28.

The clearance provided by the space 36, between the front edge 35 of the lid 23 and the wall 37 of the press (see FIGURE 4) prevents the lid 23 from becoming jammed by pieces of scrap metal. If pieces of scrap metal should get into the space 36, the lid 23 is slightly opened and the press platen 11 is somewhat advanced and then retracted, so that it pushes the scrap metal forward and leaves room below the space 36 into which pieces of scrap metal can fall. These pieces of scrap metal can then be compressed with the remainder of the charge in the press box 10. During this operation, the cover plate 43 prevents the pieces of scrap metal in the space 36 from falling behind the press platen 11.

FIGURE 6 illustrates an alternative embodiment of the scrap baling press in accordance with this invention. This press is similar in construction and in operation to that illustrated by FIGURES 1–5, inclusive. As noted hereinbefore parts illustrated by FIGURE 6 which generally correspond to like parts illustrated by FIGURES 1–5, inclusive, are designated by numerals which are higher by 100 than those in FIGURES 1–5, inclusive.

The essential difference in structure between the press illustrated by FIGURE 6 and that shown by FIGURES 1–5, inclusive, is the two hydraulic cylinders and pistons which drive its platen for the first stage of the compression of scrap metal in its press box. Referring specifically to FIGURE 6 it will be seen that this press has two pistons 113, 113 which are movable in cylinders 47, 47 whereas the press illustrated by FIGURES 1–5, inclusive, is provided with a single piston 13 carried by a hydraulic cylinder and two guide rods 12, 12.

FIGURE 6 includes a diagrammatic illustration of a hydraulic system and of control devices which are adapted for this particular press. As will be readily appreciated by those skilled in this art, the hydraulic system illustrated by this figure can be readily adapted to operate the press illustrated by FIGURES 1–5, inclusive.

Reference to FIGURE 6 will show that its cylinders 47, 47 are hydraulically connected in parallel. Each hydraulic cylinder has a chamber around its piston 113 connected to the pipe 48 and a chamber behind its piston connected to the pipe 49. The chambers around the pistons 113, 113 have smaller effective areas than those behind the pistons. When the hydraulic pressure is the same in each of the pairs of cylinders 47, 47 the pistons 113, 113 are pushed outwardly and the press platen 111 is pushed into the press box 110 and compresses any charge of scrap metal situated therein. On the other hand, if the pressure in the cylindrical chambers to which the pipes 49, 49 are connected and which have the larger effective areas is brought to zero, the pressure in the chambers to which the pipes 48, 48 are connected and which have the smaller effective areas moves the piston rearwardly and withdraws the platen 111 from the press box 110. The remaining operating cylinders of this press, as well as those of the press described with reference to FIGURES 1–5, inclusive, operate in the same manner.

In the following description of the press illustrated by FIGURE 6, the chambers of the various cylinders which have the larger effective areas will be referred to as "main chambers," while those with the smaller effective areas will be termed "return chambers."

Still referring to FIGURE 6, the hydraulic system for operating the press comprises a pump 51 which is driven by a motor 50, a pressure pipe 52, a suction pipe 53, a reservoir 54, for a hydraulic liquid to which the suction pipe 53 is connected and a control box 55 having five hand levers 63, 64, 65, 66 and 67. The pipe 52 is branched through a distributor 56 into six separate pressure pipes 57, 58, 59, 60, 61 and 62. The pipe 57 is connected in parallel to five valves (not shown by the drawing), located in the control box 55, each of which controls the operation of one of the hydraulic cylinders of the press. These valves can be actuated by hand by means of the levers 63, 64, 65, 66 and 67.

Each of the valves 63, 64, 65, 66 and 67 has three positions. One of these positions connects the pressure pipe 57 with a pressure pipe leading to a main chamber of one of the hydraulic cylinders of the press, a second closes the connection between the pressure pipe 57 and the pressure pipe leading to the main chamber of the hydraulic cylinders, and the third position connects the pressure pipe leading to the main chamber of the hydraulic cylinder to the distributor 78 which is in turn connected to the pipe 79 which opens into the reservoir 54 and through which hydraulic fluid is returned to the reservoir 47. Thus, for example, the valve controlled by the lever 63 either connects the pressure pipe 57 with the pressure pipe 68 or it shuts off the pipe 68 or it connects the pressure pipe 68 through the distributor 78 to the return pipe 79.

The method for the operation of the valve controlled by the lever 63 which operates the hydraulic cylinders 47, 47 and thereby controls the movement of the pistons 113, 113 and the platen 111 will be described in detail. The pressure pipe 58 is connected in parallel to the pipes 48, 48 through the connector 80. The pipes 48, 48, are, in turn, connected to the return chambers of the cylinders 47, 47. These return chambers are therefore always under pressure when the pump 51 is in operation. The pressure pipe 68 from the valve operated by the lever 63 is connected in parallel to the pressure pipes 49, 49 by the connector 81. The pressure pipes 49, 49 are, in turn, connected to the "main chambers" of the hydraulic cylinders 47, 47.

In the operation of the hydraulic cylinders 47, 47 by means of the lever 63, one position of the lever 63 causes the valve it controls to shutoff the pressure pipe 68, and therefore shutoff the hydraulic pressure in the main chambers of the hydraulic cylinders 47, 47. Since the return chambers of the cylinders 47, 47 are still under hydraulic pressure, the pistons 113, 113 and the platen 111 are moved to their most rearwardly position or retained in that position. When the lever 63 is moved to a second position in which it causes the valve which it controls to connect the pressure pipe 57 to the pipe 68, the main chambers of the cylinders 47, 47 are placed under hydraulic pressure. This hydraulic pressure in the main chambers of the cylinders 47, 47 is preponderant over that in the return chambers of the cylinders, due to the larger effective areas of the main chambers and the pistons 113, 113 and the platen 111 are forcefully moved in a forwardly direction. When the lever 63 is moved to its third operative position, in which its valve connects the pipe 68 through the pipe 73, header 78 and return line 79, only the pressure in the return chambers is effective since there is no pressure being supplied to the main chambers of the cylinders 47, 47. This effective pressure in the return chambers of the cylinders 47, 47 causes the pistons 113, 113 and the platen 111 to move backwardly. The backwardly movement of the pistons 113, 113 causes the hydraulic liquid in the main chambers of the cylinders 47, 47 to flow through the pipes 49, 49, the connector 81, the pipes 68 to the pipe 73 from which it flows through the header 78, and the return line 79 to the reservoir 54.

The lever 64 operates the valve which controls the flow of hydraulic fluid to and from the hydraulic cylinder 82 and is connected to its main chamber by the pipe 69. This valve is connected to the header 78 by the pipe 74. The header 56 is connected to the return chamber of hydraulic cylinder 82 by the pipe 59. The hydraulic cylinder 82 carries the piston 120 which is supported and guided by the guide tube 83. The piston 120 is connected to the platen 120 which gives a bale of scrap metal its final stage of compression.

The lever 65 operates the valve which controls the flow of fluid to and from the hydraulic cylinder 84, and is connected to the main chamber of that cylinder by the pipe 70. The return chamber of the hydraulic cylinder 84 is connected to the header 56 by the pipe 60. The hydraulic cylinder 84 carries the piston 121 which is connected to the slide 119 which closes the opening 118 through which a completed bale of scrap metal is ejected from the press box 110.

The lever 66 operates the valve which is connected by pipe 71 to the main chamber of hydraulic cylinder 85. The return chamber of hydraulic cylinder 85 is connected to the header 56 by the pipe 61. The hydraulic cylinder 85 is mounted in a traverse member 86 which is carried by pivots 87, 87 mounted in bearings 88. The hydraulic cylinder 85 carries the piston 124 which opens and closes the lid 123 of the press box 110.

The lever 67 operates the valve which is connected by pipe 72 to the main chamber of hydraulic cylinder 89. The return chamber of hydraulic cylinder 89 is connected to the header 56 by the pipe 62. The hydraulic cylinder 89 carries the piston 128 which operates the press platen 126 in the charging trough 125 of the press.

The levers 64, 65, 66 and 67 each controls the three positions of its valve, which in turn controls the movements of the piston in the hydraulic cylinder to which it is connected in the same manner as the lever 63 controls the movement of the pistons 113, 113 within the hydraulic cylinders 47, 47, which has been described hereinbefore.

It will, of course, be understood that the hydraulic system illustrated by FIGURE 6 includes the auxiliary parts, such as overflows, non-return valves and excess pressure valves and the like which are usual components of a hydraulic installation. Such convention components have been omitted from FIGURE 6 for the purposes of clarity.

From the foregoing description of the hydraulic system illustrated by FIGURE 6 it will be appreciated that an operator stationed at the control box 55 can by the operation of the levers 63–67, inclusive, independently control each of the hydraulic cylinders of the press and can operate two or more at one time. For example, the cylinder 89 can be operated by the control lever 67 to precompress a charge of scrap metal in the charging trough 125, at the same time that cylinder 82 is operated by control 64 to give a bale of scrap metal its final compression in the press box 110.

To adapt the hydraulic system illustrated by FIGURE 6, the only modification required is the elimination of the connector 80, the pipes 48, 48, the connector 81 and the pipes 49, 49, to directly connect the pipe 58 to the return chamber of the hydraulic cylinder which carries piston 13 and the pipe 68 to the main chamber of that hydraulic cylinder.

The foregoing are details as to the construction of preferred embodiments of the press in accordance with this invention and as to a hydraulic system by which the press is operated and controlled. These details have been given only for the purpose of fully illustrating the invention and it will be fully understood that many modifications and changes can be made in these details without departing from the spirit of my invention or the scope of the claims which follow. Thus, for example, only one platen may be positioned in the press box with the elimination of the second platen and associated parts illustrated by the drawings. Again, the slide which closes the opening through which the completed bales of scrap metal are ejected from the press and the hydraulic cylinder which operates that slide can be replaced by a counter-pressure ram and platen for closing this opening. Many other such modifications in the details of this press will be obvious to those skilled in this art.

I claim:

1. A press for the compression of scrap metal which comprises a press box, a platen moveable in the said press box, a means for moving said platen within said press box, a charging trough having an opening through which scrap metal can be discharged into said press box above the path of movement of the platen therein, a charging platen moveable in the said charging trough, a means for moving the said platen backwardly and forcefully forwardly in the said charging trough, a lid for the press box hinged to one side thereof which has an upwardly extension at its edge adjacent the charging trough which, when the lid is closed, closes the end of the charging trough and forms a retaining wall against which scrap metal in the charging trough can be partially compressed and foreshortened by the action of the said charging platen and which lid when open forms a continuation of one side of said press box adjacent the said opening from the charging trough to the said press box, and a means for opening and forcefully closing the said lid.

2. A press for the compression of scrap metal into bales which comprises a press box, a platen movable in the said press box, a means for moving said platen within said press box, a charging trough having an opening through which scrap metal can be discharged into the said press box above the path of movement of the platen therein, a charging platen movable in the said charging trough, a means for moving said charging platen backwardly and forcefully forwardly in the said charging trough, a lid for the press box hinged to one side thereof which has an upwardly extension along its edge adjacent the charging trough which when the lid is closed, closes the end of the charging trough and forms a retaining wall against which scrap metal can be partially compressed and foreshortened and which lid when open forms a continuation of one side of the said press box adjacent the said opening from the charging trough to the said press box, a means for opening and forcefully closing the said lid, and a fixed retaining wall which extends upwardly forming an extension of the wall of the press box opposite the charging platen against which scrap can be partially compressed and foreshortened by the action of the charging platen when the said lid of the press box is in open position.

3. A press for the compression of scrap metal into bales which comprises a press box, a platen movable in the said press box, a means for moving said platen within said press box, a charging trough having an opening through which scrap metal can be discharged into the said press box above the path of movement of the platen therein, a charging platen movable in the said charging trough, a means for moving said charging platen backwardly and forcefully forwardly in the said charging trough, a lid for the press box hinged to one side thereof which has an edge which is in substantially the same plane as the edge of the bottom of the said charging trough adjacent its opening into the press box and which, when the lid is closed, is situated below the bottom edge, and which lid forms, when open, a continuation of one side wall of said press box adjacent the said opening from the charging trough to the said press box, a means for opening and forcefully closing the said lid, a fixed retaining wall which extends upwardly forming an extension of the wall of the press box on the side of the opening of the press box opposite the hinged side of the lid of the press box and a fixed retaining wall which extends upwardly to form an extension of the wall of the press box on the side of the opening opposite the charging platen of the press against which scrap metal can be partially compressed and foreshortened by the action of the charging platen; the said upwardly extending walls and the hinged lid when in open position forming a chamber within which a charge of scrap metal can be partially compressed and foreshortened by the charging platen to dimensions which permit its downwardly movement into the press box by the action of the hinged lid as it closes the press box.

4. A press for the compression of scrap metal into bales which comprises a press box, a platen movable in the said press box, a means for moving said platen within said press box, a charging trough having an opening through which scrap metal can be discharged into the said press box above the path of movement of the platen therein, a charging platen movable in the said charging trough, a means for moving said charging platen backwardly and forcefully forwardly in the said charging trough, a lid for the press box hinged to one side thereof and forming when open a continuation of one side wall of said press box adjacent the said opening from the charging trough to the said press box, a shearing knife along the edge of the charging trough adjacent its opening into the press box and a second shearing knife along the adjacent edge of the said lid which are adapted to act cooperatively to cut any pieces of scrap metal coming between them, a means for opening and forcefully closing the said lid, a fixed retaining wall which extends upwardly forming an extension of the wall of the press box on the side of the opening of the press box opposite the hinged side of the lid of the press box and a fixed retaining wall which extends upwardly to form an extension of the wall of the press box on the side of the opening opposite the charging platen of the press against which scrap metal can be partially compressed and foreshortened by the action of the charging platen; the said upwardly extending walls and the hinged lid when in open position forming a chamber within which a charge of scrap metal can be partially compressed and foreshortened by the charging platen to dimensions which permit its downwardly movement into the press box by the action of the hinged lid as it closes the press box.

5. A press for the compression of scrap metal into bales which comprises a press box, a platen movable in the said press box, a means for moving said platen within said press box, a charging trough having an opening through which scrap metal can be discharged into the said press box above the path of movement of the platen therein, a charging platen movable in the said charging trough, a means for moving said charging platen backwardly and forcefully forwardly in the said charging trough, a lid for the press box the edge of which adjacent the charging trough has an upwardly extension which, when the lid is closed, closes the end of the charging trough and forms a retaining wall against which scrap metal in the charging trough can be partially compressed and foreshortened, the said lid being hinged to one side thereof and forming when open a continuation of one side wall of said press box adjacent the said opening from the charging trough to the said press box, a means for opening and forcefully closing the said lid, a fixed retaining wall which extends upwardly forming an extension of the wall of the press box on the side of the opening of the press box opposite the hinged side of the lid of the press box and a fixed retaining wall which extends upwardly to form an extension of the wall of the press box on the side of the opening opposite the charging platen of the press against which scrap metal can be partially compressed and foreshortened by the action of the charging platen; the said upwardly extending walls and the hinged lid when in open position forming a chamber within which a charge of scrap metal can be partially compressed and foreshortened by the charging platen to dimensions which permit its downwardly movement into the press box by the action of the hinged lid as it closes the press box.

References Cited in the file of this patent

UNITED STATES PATENTS

| | | |
|---|---|---|
| 1,812,797 | Lindemann | June 30, 1931 |
| 1,850,134 | Myer | Mar. 22, 1932 |
| 1,932,041 | Jacobson | Oct. 24, 1933 |
| 2,616,312 | Jones et al. | Nov. 4, 1952 |
| 2,643,558 | Lindemann | June 30, 1953 |
| 2,865,284 | Thompson et al. | Dec. 23, 1958 |

FOREIGN PATENTS

| | | |
|---|---|---|
| 830,062 | Germany | Jan. 31, 1952 |
| 671,596 | Great Britain | May 7, 1952 |

OTHER REFERENCES

Iron Age, volume 170, issue 8, page 40, published Aug. 21, 1952.